United States Patent [19]
Andersen, Sr.

[11] 3,862,279
[45] Jan. 21, 1975

[54] SUBSURFACE AERATOR AND MIXER

[76] Inventor: Walter Andersen, Sr., 1443 W. Birchlawn Pl., Ottawa, Ill. 61350

[22] Filed: June 26, 1973

[21] Appl. No.: 373,903

[52] U.S. Cl. ................................................ 261/77
[51] Int. Cl. .............................................. B01f 3/04
[58] Field of Search ..................................... 261/77

[56] References Cited
UNITED STATES PATENTS

| | | | |
|---|---|---|---|
| 1,143,162 | 6/1915 | Armstrong | 261/77 |
| 1,821,914 | 9/1931 | Wagener | 261/77 |
| 1,853,045 | 4/1932 | Gnau | 261/77 |
| 2,008,853 | 7/1935 | Dietzel | 261/77 |
| 2,658,735 | 11/1953 | Ybarrondo | 261/77 |
| 2,715,521 | 8/1955 | Tatibana | 261/77 |
| 2,798,794 | 7/1957 | Muench et al. | 261/77 |
| 3,271,304 | 9/1966 | Valdespino et al. | 261/77 |
| 3,446,488 | 5/1969 | Mail et al. | 261/77 |
| 3,452,966 | 7/1969 | Smolski | 261/124 |
| 3,628,775 | 12/1971 | McConnell et al. | 261/77 |

FOREIGN PATENTS OR APPLICATIONS 497,307  4/1927  Germany ........................... 261/77

OTHER PUBLICATIONS
Sears "Spring through Summer" Catalogue, 1973, page 929, Sears, Roebuck & Co., Philadelphia, Penn.

Primary Examiner—Tim R. Miles
Attorney, Agent, or Firm—Merriam, Marshall, Shapiro & Klose

[57] ABSTRACT

A subsurface aerator and pump for waste water treatment comprises a plurality of vertical helical tubes into the lower end of each of which a jet of air is injected. The tubes are provided in their interior surfaces with closely spaced transverse ridges which break up the air stream into small bubbles, thereby not only improving the rate of transfer of oxygen from the air to the water but also reducing or eliminating cavitation or slugging, and thus increasing the pumping effect of the aerator.

16 Claims, 9 Drawing Figures

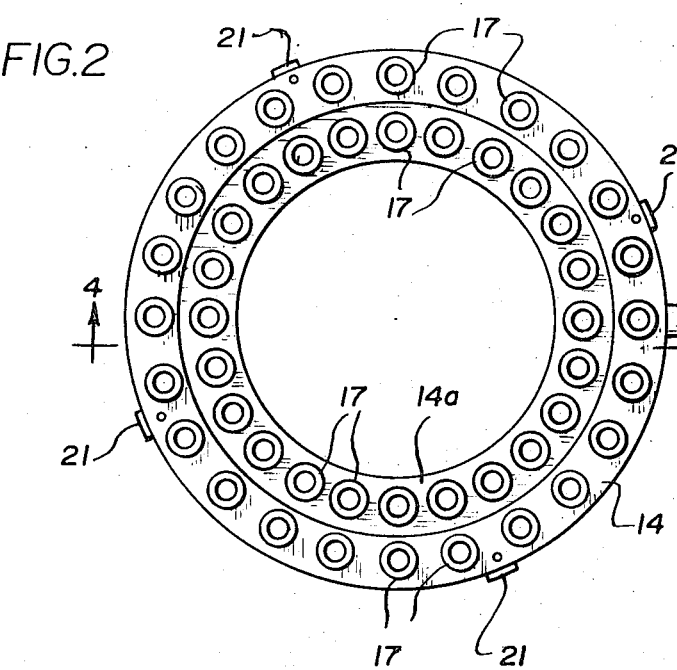
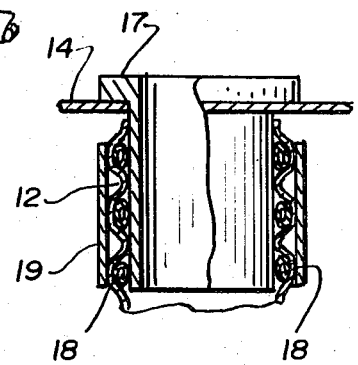
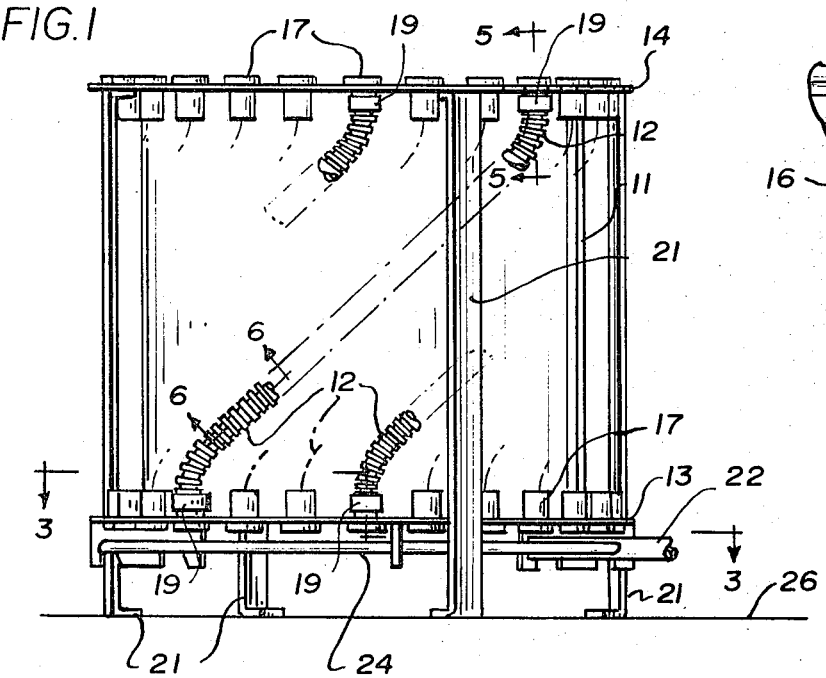
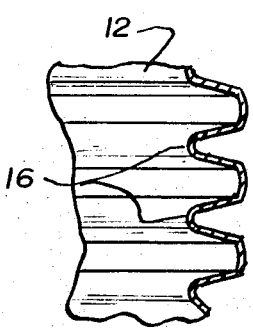

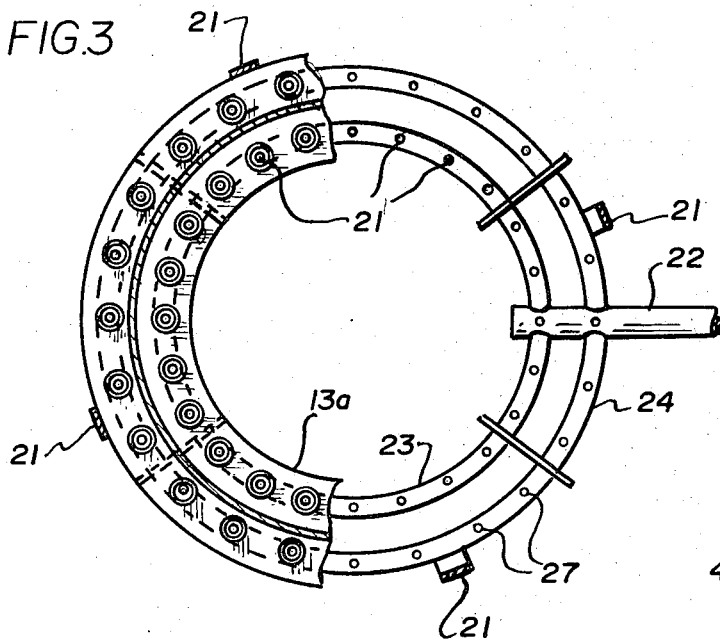
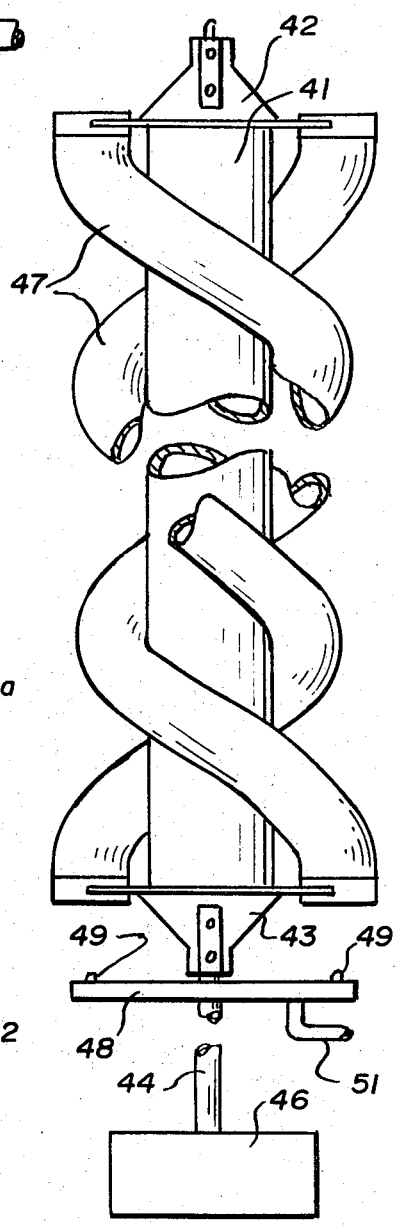
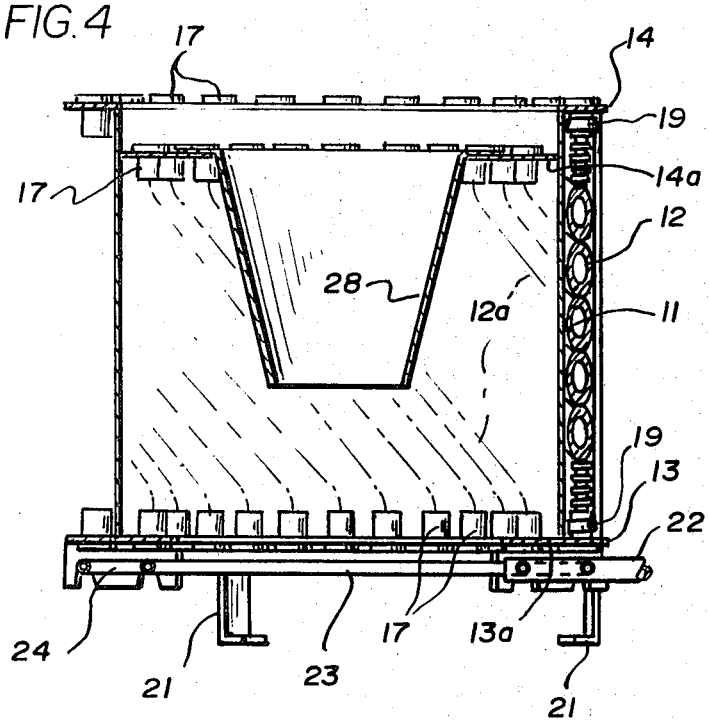

3,862,279

SUBSURFACE AERATOR AND MIXER

This invention relates to apparatus for treating a body of liquid with a gas. More particularly, it relates to apparatus which can be used for aeration of bodies of water with simultaneous pumping, whereby efficient mixing or destratification of the body of liquid is also accomplished.

A conventional step in the treatment of waste water or sewage is mechanical aeration of the liquid in order to supply the oxygen for consumption by bacteria which convert the organic waste materials contained therein into simpler, stable degradation products. In one form of such treatment, the waste water is accumulated in open, relatively shallow digestion tanks provided with conventional surface aerators which transfer oxygen from the atmosphere into the water to supply the oxygen demand of the system. Surface aerators of this type usually comprise mechanical devices which violently agitate the surface of the water in order to cause the absorption of atmospheric oxygen into the water. Such surface aerators possess a number of serious disadvantages. In addition to being relatively inefficient and requiring large amounts of power for operation, surface aerators must generally be removed from the tanks in those areas where the winter temperature falls below freezing, in order to avoid damage to the equipment caused by the ice formation in the digestion tank. In addition, since dissolved oxygen must be brought into intimate contact with the bacteria and the organic material in the water at all times for the digestion to be effective, the water in the digestion tank or cell must be sufficiently circulated so that the oxygen absorbed at the surface of the tank can be transmitted and diffused efficiently throughout the entire contents thereof. The surface aerators in conventional use are relatively inefficient surface pumps and therefore do not always adequately circulate the water in the extreme lower levels of the digestion tanks, thereby decreasing the efficiency of the process.

As an alternative to surface aerators it is known to use subsurface aerators comprising a submerged vertical tube containing a helical inner baffle which defines two helical conduits within the tube (see U.S. Pat. No. 3,452,966, patented July 1, 1969). Compressed air is injected into the lower end of the tube, causing a stream of upwardly moving bubbles which results in aeration and circulation of the contents of the tank. Apparatus of this type produces a more effective pumping action than does a surface aerator, but its efficiency is dependent on the rate at which the injected air can pass through the tube without slugging or surging, and also on the intimacy of contact between the injected air and the water in the tubing.

In accordance with the present invention there is provided an improved subsurface mixing aerator and pumping apparatus which employs a stream of air or other compressed gas injected into the lower end of one or more submerged open helical conduits or tubes. In passing upwardly through the tubes, the gas is absorbed by the liquid and in addition creates an upwardly moving stream of liquid which is effective to circulate and mix the contents of a tank or other body of liquid in which the apparatus is installed. The apparatus of the present invention is particularly characterized by the presence in the tubes of a system of inwardly projecting generally transverse ribs which function to break up the injected gas, which has a tendency to collect in large bubbles and slugs, into minute, finely divided bubbles, thereby not only enhancing the rate of absorption of the gas into the liquid but also improving the rate of flow of the gas through the tube without cavitation or slugging. As a result of the intimate contact of gas and liquid produced in the tube, the efficiency of gas transfer is markedly improved, so that, for example, a given oxygen demand in a digestion tank or oxidation cell can be achieved with lower overall flow rates of air, thus reducing the power requirements required for pumping the air necessary to satisfy the oxygen demand. In addition, the higher flow rates of gas which can be passed through each individual tube in the present invention markedly increase the pumping ability of the apparatus. Accordingly, effective mixing in a tank of given size can be more readily achieved using fewer or smaller individual pieces of apparatus which can be readily installed in many cases without the necessity for draining the tank.

Although it is expected that the invention will find its greatest use for aerating and recirculating bodies of water, it should be understood that it is not restricted thereto. Thus, when the terms "air," "aeration," "oxygen" or "water" are used in the following description and the appended claims, it will be appreciated that the invention can also be used with any other gas or mixture of gases and any other liquid. For example, the gas can be chlorine or a mixture of air and chlorine, for use in chlorinating a settling tank or swimming area in a lake. Similarly, the gas and liquid can be reactants in a chemical process requiring intimate gas-liquid contact and efficient circulation and mixing.

The invention will be better understood from the following detailed description thereof, taken in conjunction with the accompanying drawings, in which the same numerals are used to indicate like elements in the various views, and in which:

FIG. 1 is an elevational view of one embodiment of the invention having a large number of air tubes, which is intended primarily for aeration of relatively shallow bodies of water;

FIG. 2 is a top view of the embodiment of FIG. 1;

FIG. 3 is a sectional view along the line 3—3 of FIG. 1;

FIG. 4 is a vertical section along the line 4—4 in FIG. 1, with the addition of a circulation control cone;

FIG. 5 is an enlarged detail in partial section along the line 5—5 of FIG. 1, showing the means used to join the tubes to the upper flange;

FIG. 6 is an enlarged fragmentary sectional view along the line 6—6 of FIG. 1, showing the wall configuration of the air tube used in the embodiment;

FIG. 7 is an elevational view of another embodiment of the invention employing only two air tubes and intended primarily for underwater pumping and recirculation;

Figure 9:
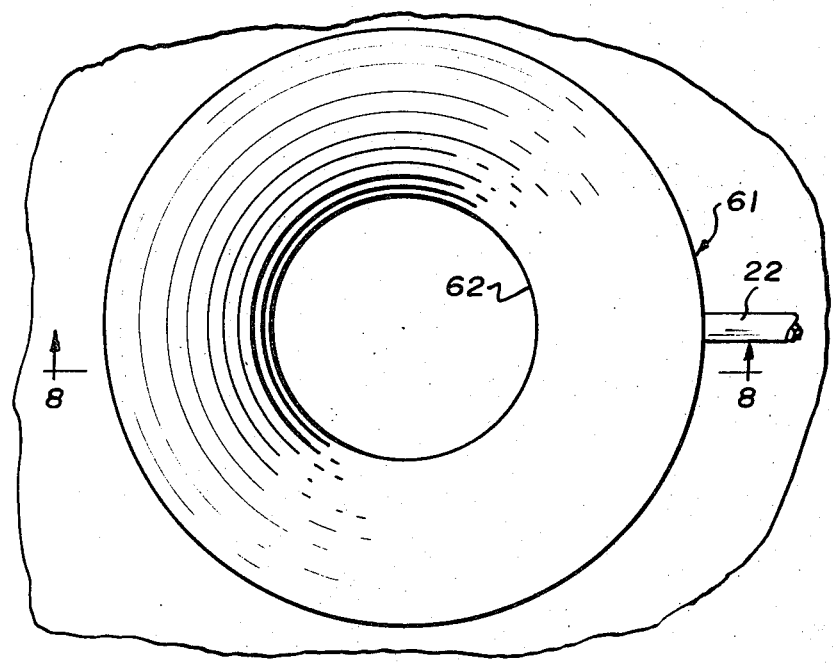
FIG. 9 is a sectional view, along the line 8—8 of FIG. 8.

As shown in FIGS. 1–4, in one embodiment the aerator 10 of the invention comprises a vertical open cylinder 11 used as a support for a plurality of flexible tubes 12 which are wound helically around the outside surface of the cylinder, with their lower ends supported by lower flange 13 attached to the lower end of cylinder 11 and their upper ends supported by upper flange 14 attached to the upper end of cylinder 11. As shown in detail in FIG. 6, tubes 12 have a corrugated inner surface comprising a plurality of closely spaced, inwardly extending ridges 16 which extend partially or completely around the tubes.

Tubes 12 can be fastened in any convenient manner to the upper and lower flanges 13 and 14, provided the openings of the tubes are unimpeded. Suitable means for attaching the tubes to the flanges is shown in detail in FIG. 5. As shown, a bushing 17 extends through a suitably sized opening in flange 14. The lower end of the bushing is inserted into the open end of a tube 12, which is provided with a plurality of suitably shaped (e.g., circular) support rings 18 in the spaces between ridges 16. The support rings 18 are used to support the tube against collapse from the pressure applied by circular clamp 19 which is used to secure the end of the tube to bushing 17. It will be apparent to those skilled in the art that any other equivalent means of attaching the ends of the tubes to the flanges can be used.

In order to increase the aeration capacity of aerator 10 shown in FIG. 1, it is provided with a second set of air tubes 12a (FIGS. 3 and 4) located adjacent the inner surface of cylinder 11, the ends of which tubes are supported by upper inner flange 14a and lower inner flange 13a, respectively.

Cylinder 11 is supported by legs 21 a sufficient distance above the bottom 26 of the body of water on which it rests to permit free access of water to the bottom of the assembly. Immediately below the open lower ends of tubes 12 and 12a is an air supply system comprising an air supply pipe 22 supplying inner and outer circular manifolds 23 and 24 (FIG. 3). The inner and outer manifolds 23 and 24 are provided on their upper surfaces with orifices 27 which are located immediately below the open ends of tubes 12 and 12a. Air supplied under pressure from a source not shown through air supply pipe 22 to manifolds 23 and 24 passes through each orifice 27 as a jet directly into the open end of each of tubes 12 and 12a. The air rises in each tube, entraining the water in the tube and causing it to be pumped from the inlet end of each tube to the outlet thereof. During its upward travel through the tubes, the stream of air released from the manifolds comes into contact with ridges 16, primarily in the upper surfaces of the tubes but also to a lesser extent in the other portions thereof. Ridges 16 break up the relatively large bubbles of air which form initially in tubes 12 and 12a and after a relatively short travel through the tube, the air stream is converted into finely divided air bubbles, thereby not only improving the rate of oxygen transfer from the air to the water but also permitting each tube to accommodate a high rate of air flow without cavitating, slugging or surging.

The ridges 16 which are present in the interior of tubes 12 and 12a constitute an essential feature of the invention. As previously indicated, the primary function of the ridges is to break up the stream of air passing through the tubes, which is initially in the form of large bubbles or slugs, into much smaller, minute bubbles which flow smoothly through the tubes without cavitation or surging. In order to be effective, the ridges must extend far enough into the tube to cause the large bubbles which impinge on the walls of the tube to be subdivided into bubbles of a much smaller size. Similarly, the spacing between ridges cannot be excessively large or small, since in either such case, the wall approaches a smooth configuration which is ineffective. While the size and spacing of the ridge depends to certain extent on the diameter of the tubes, ridges having a height of about 1/4–3/4 inch and a spacing of about 1/2–1 inch will be generally satisfactory for use with air tubes of the most convenient sizes, i.e., those having diameters of 2–6 inches. It is further preferred that the ridges have a maximum width, at the base, of not more than about 1/2 the spacing distance. In a particularly preferred embodiment, the ridges are spaced about 1/2 inch apart, are about 3/8 inch high and taper in thickness from about 1/8 inch at the inner end to about 1/4 inch at the base, where they are attached to the tube wall.

The ridges described above can be provided in several ways. In one acceptable version, each ridge is separate from the others, being formed by a complete circumferential ring formed in or attached to the wall of the tube. In another version, the ridges can be made by a single helical projection which extends the length of the tube in the manner of a screw thread. In either case, the adjacent ridges are generally parallel and transverse to the axis of the tube.

Since the stream of gas tends to travel along the upper portions of the tubes, it is essential that the above-described ridges be provided at least in the upper surfaces of the tubes. It is preferred, but not essential, that similar ridges also be provided in the lower tube surfaces. In addition to improving the break-up of the gas stream into small bubbles, the lower ridges tend to collect solid particles of waste matter which are entrained in the water stream in the tubes but which are too large or heavy to be carried completely therethrough. Instead of falling directly back to the bottom of the body of water, the solid particles tend to be caught in the lower ridges of the tubes, and remain in contact with the oxygen-rich water passing through the tube. Thus, the digestion of such particles is enhanced as a result of which they are reduced in size to a point where they are swept out of the tubes by the upwardly moving stream of liquid therein.

The rate at which the air stream will pass through an open inclined tube of a given length submerged in a liquid depends in part on the pitch or angle of inclination. The turns of helical tubes 12 and 12a are inclined at a pitch or angle which is preferably in the range of about 30°–60° from the horizontal. When the tube is more nearly horizontal, (i.e., the pitch is close to 30°) the air speed passing through the tube is relatively low, and the residence time in the tube is correspondingly large, thereby improving the efficiency of the oxygen transfer from the air stream to the water. On the other hand, when the tube is more nearly vertical (i.e., the pitch is close to 60°), the air stream passes through the tube at a higher velocity, which is also imparted to the entrained water. As a result, the stream of water leaves the tube with considerable momentum, which increases the efficiency of the unit as a mixing pump or circulator of the body of water in which the unit is placed.

When the pitch of the air tubes increases above about 60°, the efficiency of oxygen transfer decreases slightly, while the pumping ability of the device drops for pitches below about 30°. The pitch values of about 30°–60° accordingly represent a preferred range for a combination of efficient oxygen transfer and good pumping ability. Within the preferred range, either effect (i.e., oxygen transfer or pumping) can be emphasized by suitable selection of the pitch angle.

It will be seen in the embodiment of FIG. 4 that the upper ends of the inner tubes 12a are at a lower elevation than the corresponding upper ends of outer tubes 12. The relative elevation of the upper or discharge openings of the inner and outer tubes is a matter of choice depending on the conditions and the results that are to be achieved. During normal operation of the device, the aerator 10 rests on the bottom 26 of the tank or other body of water, supported by legs 21 which should be long enough to create adequate clearance between the bottom and the inlet portion of the tubes 12 and 12a for water to enter the tubes for entrainment by the upwardly traveling streams of air in each tube. When the mixture of air bubbles and water emerges from the upper openings of the tubes, it has a substantial velocity which causes the stream of water to continue in a generally upward direction for a substantial distance, sufficient generally to secure mixing of the body of water. In general, the exit velocity of a stream of air and water leaving one of the tubes depends on the length thereof, a longer tube achieving a greater upward velocity than a shorter one. Thus, in FIG. 4, the exit velocity from inner tubes 12a is somewhat less than that from outer tubes 12 and there is accordingly a greater tendency for a portion of the exit stream leaving the upper ends of tubes 12a to be recirculated downwardly through the central opening of cylinder 11 and thence to the inlet openings of tubes 12 and 12 a. The downward movement of the water in the central portion of cylinder 11 tends to improve the agitation at the bottom of the apparatus, thereby keeping in suspension whatever solid waste materials may be present at the inlet area of the apparatus. Although recirculation of a portion of the pumped water in this manner improves the mixing at the bottom of the apparatus, the effective rate of oxygen transfer is decreased, since recirculated water is at least partially saturated with oxygen and accordingly cannot absorb as great a quantity thereof as can water which has not yet passed through the aerator. Thus, by adjusting the relative heights of the exit portions of the upper ends of tubes 12 and 12a, a balance between oxygen transfer and recirculation, particularly in the entrance to the air tubes of the apparatus, can be achieved.

Another means for controlling the recirculation of water is also depicted in FIG. 4. As shown, a truncated hollow cone 28 is inserted in the circular opening of upper inner flange 14a, the effect of which is to restrict the cross-sectional area of the interior of cylinder 11. By adjusting the size of the opening in the cone the proportion of recirculated water can be adjusted at will from zero, by blocking off the central opening entirely, to a maximum, by having no restriction in the interior of cylinder 11.

In the embodiment shown in FIG. 4 employing two sets of tubes, the rotational sense of the helical turns of the inner tubes 12a and the outer tubes 12 can be the same (i.e., both similar to a right-hand thread or to a left-hand thread) or opposite (i.e., one set of tubes being right-handed and one left-handed). The stream of water issuing from the top of each set of tubes has imparted to it a rotational, whirlpool effect produced by the helical configuration of the tubes. When both sets of tubes have the same rotational sense, the whirlpool effect is intensified, thereby tending to create relatively strong mixing currents in the body of water. When opposite rotational senses are used in the two sets of tubes the currents tend to neutralize each other and the whirlpool effect is diminished.

For proper operation of the embodiment shown in FIGS. 1–4, which is designed to emphasize the efficiency of oxygen transfer rather than pumping ability, the apparatus should be completely submerged in the body of water, with the upper ends of the air tubes at least about 8 to 10 inches below the surface of the water. Since the transfer of oxygen from the air to the water occurs very rapidly within the tubes there is no requirement for deeper immersion of the apparatus. Accordingly, efficient oxygen transfer can be achieved in relatively shallow digestion tanks.

The size of the tubes 12 and 12a which are used in the invention depends on the rate of air supplied thereto and the requirements of the particular installation. For apparatus suitable for use in a typical industrial commercial or waste treating plant, it is contemplated that tube diameters on the order of 4–6 inches are suitable. In one typical embodiment, the apparatus was constructed using a cylinder 11 having a height and diameter of about 4 feet. This embodiment was supplied with 24 outer tubes 12 wrapped on the outer surface of the cylinder and 20 inner tubes 12a installed inside the cylinder, each tube being 64 inches long and having a diameter of 4 inches. The pitch of the outer tubes was 40°, while the pitch of the inner tubes was 60°. As a consequence of the difference in pitch, the inner tubes tended to pump water at a faster rate, thereby preventing the starving of the inner set of tubes at the inlet ends. The air tubes used in this embodiment were provided with 24 parallel circumferential ridges per foot of length, each ridge being about 3/8 inch high and tappering in width from about 1/8 inch at the top to 1/4 inch at the base. This unit was provided with air supply orifices for injecting the air to the inlet of each tube which had a diameter of 3/16 inch. With orifices of this size the apparatus was capable of pumping about 7,200 gallons per minute of water, using 86 SCFM of air at 4 psig and requiring 2.4 HP. When the air supply orifices were increased to 5/16 inch in diameter, the unit could pump over 12,000 gallons per minute, using 110 SCFM at 10 psi and 8.4 HP. In either case, the oxygen efficiency transferred to the liquid was in the range of about 6–8 lbs.$O_2$/HP/hr. By decreasing the pitch of the inner or outer tubes, or both, increased oxygen transfer efficiencies could be obtained.

Figure 8:
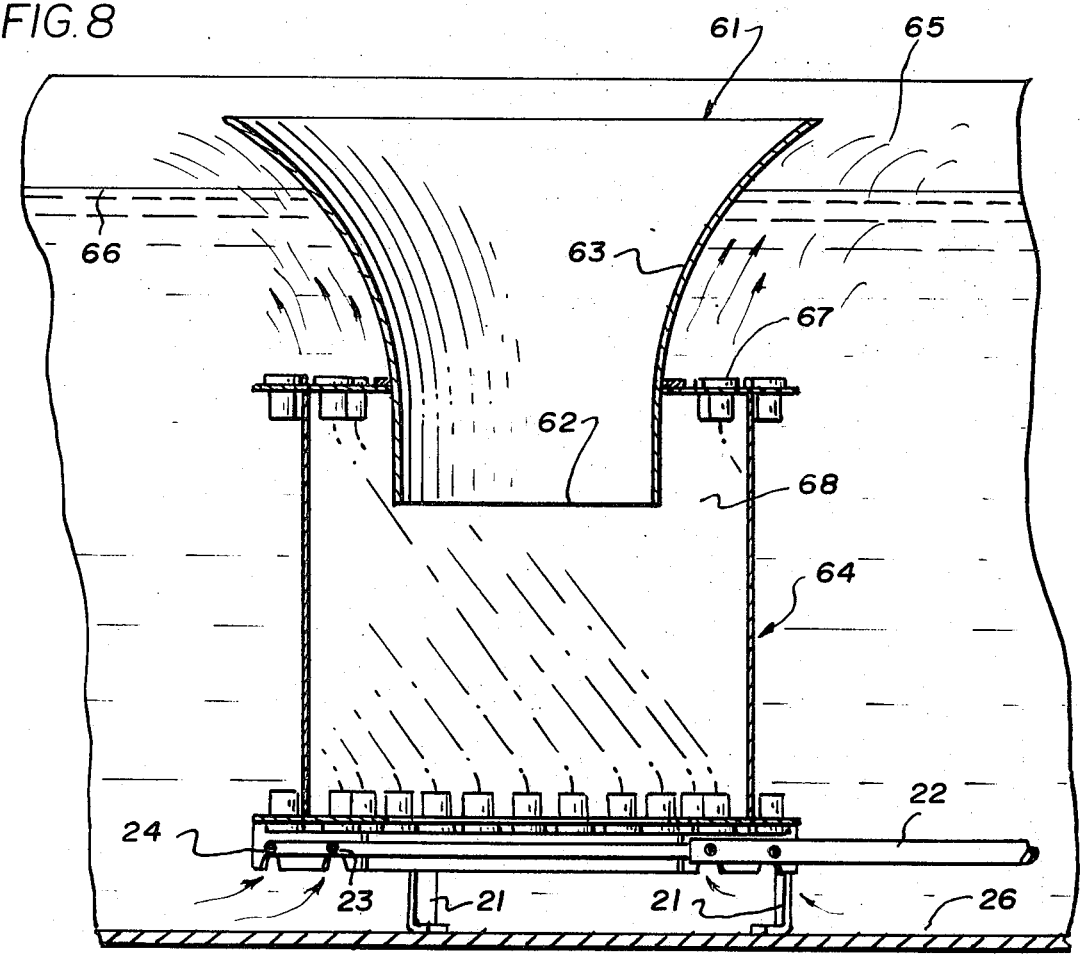
FIG. 8 is a top view of an embodiment similar to that of FIG. 1 with the addition of a spray head for creating a surface spray effect for cooling.

In some cases, it is desirable to be able to cool as well as aerate and mix a body of water or other liquid. The embodiment of the invention shown in FIGS. 8 and 9 is provided with an optional spray head for this purpose. The spray head consists of an inverted cone-like structure 61, which can be provided with suitable openings (not shown) in its walls 63 and its lower extremity 62, as necessary for recirculation control as previously explained. Spray head 61 can be attached in any suitable manner to the top of an aerator 64 similar to that shown in FIG. 1.

The upper walls 63 of the spray head 61 flare outwardly and extend upwardly a sufficient distance to protrude above the surface 66 of the body of liquid in which the apparatus is installed. The upwardly moving stream of liquid issuing from the upper ends 67 of the helical tubes 68 impinges on the walls 63 of the spray head with sufficient velocity to cause the liquid stream to be broken up into a spray 65 which is directed outwardly from the apparatus above the surface of the liquid. The increased evaporation of liquid from the spray particles into the atmosphere tends to cool the liquid in the manner of conventional surface aerators.

The embodiment of the invention shown in FIGS. 1-4 and described above is intended primarily for maximum oxygen transfer efficiency in relatively shallow digestion tanks. In another embodiment, shown in FIG. 7, the invention is effective as a highly efficient underwater pump useful for destratification of large bodies of water. Although oxygen is also transferred to water in such use, the maximum emphasis is on pumping ability, the objective being to transfer large quantities of water from the depths of the body to a point near the surface.

As shown in FIG. 7, the embodiment comprises a central support column 41 provided at its upper and lower ends with air tube supports 42 and 43, respectively. Attached to lower tube support 43 is support rod 44 attached to anchor block 46, which is intended to rest on the bottom of the body of water. Wrapped around support column 41 in helical fashion is a pair of tubes 47, the upper and lower ends of which are held by upper tube support 42 and lower tube support 43, respectively. Tubes 47 are provided with circumferential inwardly extending ridges similar to those described in connection with the embodiment of FIGS. 1-4. Tubes 47 are wound about support column 41 in such a manner that the turns of the tube have a pitch of about 30°-60° from the horizontal, as previously described.

Situated immediately below the open lower ends of tubes 47 is a manifold 48 provided with orifices 49 and an air supply pipe 51, through which compressed air is supplied to the manifold, from which it is injected through orifices 49 upwardly into the open lower ends of the tubes, as previously described. Since the embodiment shown in FIG. 7 is designed for moving large volumes of water in relatively deep bodies, there is no restriction on its length and accordingly it may be made as long as desired or necessary. It will generally be found satisfactory to use a support column 41 having a length approximately 1/3 to 1/2 the depth of the water and to adjust support rod 44 such that the intake end of the tubes is suitably positioned for effective recirculation of the water. By properly placing one or more of these devices an efficient turnover of the water in the body can be achieved. By this means, for example, oxygen deficient water from the deepest portions of the body of water can be effectively transferred to the surface to be replaced with oxygen-rich water from the surface. In addition, the oxygen absorbed by the water from the air stream adds to the beneficial results achieved by the invention.

The foregoing detailed description has been given for clearness of understanding only, and no unnecessary limitations should be understood therefrom, as modifications will be obvious to those skilled in the art.

I claim:

1. Apparatus for sub-surface aeration and circulation of a body of liquid comprising at least one generally vertical helical conduit, said conduit having open unrestricted upper and lower ends, at least part of the inner surface of said conduit being provided with a plurality of transverse, generally parallel, inwardly-extending ridges positioned approximately perpendicularly to the axis of said conduit for breaking up bubbles of gas passing through said tube, thereby decreasing cavitation and slugging;

nozzle means located below the lower end of said conduit for generating an upwardly flowing stream of bubbles of air or other gas directed into said lower end; and means for supplying compressed air or other gas to said nozzle means.

2. The apparatus of claim 1 in which the turns of said conduit have a pitch of about 30°-60° from the horizontal.

3. The apparatus of claim 1 in which said helical conduit is a circular tube.

4. The apparatus of claim 1 in which said ridges have a height of about 1/4-3/4 inch and are spaced about 1/2-1 inch apart.

5. Apparatus for sub-surface aeration and circulation of a body of liquid comprising:

a plurality of generally vertical helical tubes having a circular cross-section and unrestricted open upper and lower ends, the turns of said helical tubes having a pitch of about 30°-60° from the horizontal, the inner surface of said tubes being provided with a plurality of circumferential inwardly-extending ridges having a height of about 1/4-3/4 inch and a spacing of about 1/2-1 inch;

means for supporting said helical tubes in a generally vertical position;

nozzle means located below the lower end of each of said tubes for generating an upwardly flowing stream of bubbles of air or other gas directed into said lower end; and means for supplying compressed air or other gas to said nozzle means.

6. Apparatus for sub-surface aeration and circulation of a body of liquid comprising:

a plurality of generally vertical helical tubes having a circular cross-section and unrestricted open upper and lower ends, the turns of said helical tubes having a pitch of about 30°-60° from the horizontal, the inner surface of said tubes being provided with a plurality of circumferential inwardly-extending ridges having a height of about 1/4-3/4 inch and a spacing of about 1/2-1 inch;

means for supporting said helical tubes in a generally vertical position comprising an open vertical cylinder provided with upper and lower radial flanges into which are set the upper and lower ends of said tubes;

nozzle means located below the lower end of each of said tubes for generating an upwardly flowing stream of bubbles of air or other gas directed into said lower end; and means for supplying compressed air or other gas to said nozzle means.

7. The apparatus of claim 6 in which said flanges extend both radially inwardly and radially outwardly from said cylinder, and said tubes are located both within and without said cylinder.

8. The apparatus of claim 6 in which the upper ends of the tubes located within said cylinder are at the same elevation as the upper ends of the tubes located without said cylinder.

9. The apparatus of claim 6 in which the upper ends of the tubes located respectively within and without said cylinder are at different elevations.

10. The apparatus of claim 6 in which the turns of said helical tubes within said cylinder have the same rotational sense as the turns of said helical tubes without said cylinder.

11. The apparatus of claim 6 in which the turns of the helical tubes within said cylinder and the turns of the helical tubes without said cylinder have opposite rotational senses.

12. The apparatus of claim 6 in which the pitch of said tubes located within said cylinder is greater than that of the tubes without said cylinder.

13. The apparatus of claim 6 which is provided with means for regulating the cross-sectional area of the interior of said cylinder, thereby controlling the extent of liquid recycle from the upper exit ends of said tubes to the lower, inlet ends thereof.

14. The apparatus of claim 13 in which said regulating means is an open truncated cone.

15. The apparatus of claim 6 which is provided at its upper end with baffle means for deflecting outwardly above the surface of a body of liquid in which said apparatus is installed a stream of said liquid issuing upwardly from the upper ends of said tubes, whereby there is created a spray effect for cooling of said body of liquid by evaporation.

16. The apparatus of claim 15 in which said baffle means is an outwardly curving inverted cone extending upwardly sufficiently to protrude above the surface of said body of liquid in which said apparatus is installed.

* * * * *

UNITED STATES PATENT OFFICE
CERTIFICATE OF CORRECTION

PO-1050 (5/69)

Patent No. 3,862,279  Dated January 21, 1975

Inventor(s) Walter Andersen, Sr.

It is certified that error appears in the above-identified patent and that said Letters Patent are hereby corrected as shown below:

Col. 8, claim 8, line 64 "6" should be --7--.

Col. 9, claim 9, line 1, "6" should be --7--.

Col. 9, claim 10, line 4, "6" should be --7--.

Col. 9, claim 11, line 8, "6" should be --7--.

Signed and sealed this 8th day of April 1975.

(SEAL)
Attest:

RUTH C. MASON
Attesting Officer

C. MARSHALL DANN
Commissioner of Patents
and Trademarks